United States Patent
Miyazaki

(10) Patent No.: US 8,148,452 B2
(45) Date of Patent: Apr. 3, 2012

(54) RUBBER COMPOSITION FOR COATING TIRE CORD

(75) Inventor: Tatsuya Miyazaki, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 12/155,214

(22) Filed: May 30, 2008

(65) Prior Publication Data

US 2008/0300368 A1    Dec. 4, 2008

(30) Foreign Application Priority Data

Jun. 1, 2007 (JP) .................................. 2007-147078
Mar. 17, 2008 (JP) .................................. 2008-067292

(51) Int. Cl.
| | |
|---|---|
| C08K 3/02 | (2006.01) |
| C08K 5/00 | (2006.01) |
| C08K 5/45 | (2006.01) |
| C08K 5/35 | (2006.01) |
| C08K 5/04 | (2006.01) |
| C07F 7/18 | (2006.01) |
| C07D 209/48 | (2006.01) |
| B60C 9/00 | (2006.01) |

(52) U.S. Cl. ............. 524/84; 524/80; 524/82; 524/83; 524/87; 524/94; 524/95; 524/575.5; 524/424; 524/398; 152/451

(58) Field of Classification Search .................. 525/349; 428/457, 462, 465, 470, 625; 152/451, 565; 156/910; 524/80, 82, 83, 84, 87, 94, 95, 524/575.7, 424, 398

See application file for complete search history.

(56) References Cited

U.S. PATENT DOCUMENTS

| | | | |
|---|---|---|---|
| 4,929,512 A | | 5/1990 | Nishimura et al. |
| 5,624,764 A | | 4/1997 | Muraoka et al. |
| 5,688,871 A | | 11/1997 | Inui et al. |
| 6,120,911 A | * | 9/2000 | Beers et al. .................. 428/457 |
| 6,333,375 B1 | * | 12/2001 | Nakamura et al. ............ 524/394 |
| 2003/0220426 A1 | * | 11/2003 | Wentworth et al. ........... 524/284 |
| 2005/0192386 A1 | * | 9/2005 | Miyazaki ....................... 524/100 |
| 2005/0224150 A1 | * | 10/2005 | Suzuki ......................... 152/209.6 |
| 2006/0089439 A1 | | 4/2006 | Miyazaki |
| 2006/0266459 A1 | | 11/2006 | Miyazaki |

FOREIGN PATENT DOCUMENTS

| | | |
|---|---|---|
| DE | 3850246 T2 | 1/1995 |
| DE | 69621641 T2 | 1/2003 |
| EP | 0 719 827 A1 | 7/1996 |
| JP | 7-258476 A | 10/1995 |
| JP | 8-176342 A | 7/1996 |
| JP | 11-156997 A | 6/1999 |
| JP | 2002-327093 A | 11/2002 |
| JP | 2005-139082 A | 6/2005 |
| JP | 2005-139239 A | 6/2005 |
| JP | 2005-139241 A | 6/2005 |
| JP | 2005-239874 A | 9/2005 |
| JP | 2005-272718 A | 10/2005 |
| JP | 2006-124474 A | 5/2006 |
| JP | 2006-328194 A | 12/2006 |
| JP | 2007-63245 A | 3/2007 |
| JP | 2007-211194 A | 8/2007 |

OTHER PUBLICATIONS

STN Search Report p. 1.*
N. M. Huntink, Durability of Rubber Products, Chapter 8, Twente University Press, 2003, pp. 159, 161, 165, 166, 169.
Office Action dated Jun. 6, 2011 for Japanese Application No. 2008-67292.
Office Action dated Jan. 18, 2011 for German Application No. 102008026113.0.

* cited by examiner

*Primary Examiner* — Basia Ridley
*Assistant Examiner* — Alexander Kollias
(74) *Attorney, Agent, or Firm* — Birch, Stewart, Kolasch & Birch, LLP

(57) ABSTRACT

The object of the present invention is provide a rubber composition for coating a tire cord, which improves adhesion with a tire cord and has an effect of recovering adhesion with a tire cord at hygrothermal aging with maintaining the initial vulcanization rate. The present invention relates to a rubber composition for coating a tire cord comprising 0.7 to 3 parts by weight of benzothiazolyl sulfenamide or benzothiazolyl sulfenimide represented by the chemical formula (1):

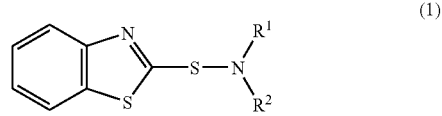

(1)

(wherein $R^1$ is a linear alkyl group having a branched structure of 3 to 16 carbon atoms, and $R^2$ is a linear alkyl group having a branched structure of 3 to 16 carbon atoms or a benzothiazolyl sulfide group) and 3 to 7 parts by weight of sulfur based on 100 parts by weight of a rubber component containing at least 60% by weight of a natural rubber and/or an isoprene rubber.

6 Claims, No Drawings

RUBBER COMPOSITION FOR COATING TIRE CORD

TECHNICAL FIELD

The present invention relates to a rubber composition for coating a tire cord and a tire cord coated with the rubber composition.

BACKGROUND ART

Usually, a tire cord is arranged inside the tire, a rubber near the tire cord locates far from the heat source during a tire vulcanization process and it is not easy to be vulcanized. Thus, N,N-dicyclohexyl-2-benzothiazol sulfenamide (DCBS) is used for vulcanization acceleration (JP-A-2005-239874).

It has been known that other sulfenamide accelerators, other thiazol accelerators and the like are used instead of DCBS. In case of using these vulcanization accelerators, since initial adhesion with a steel cord is not sufficient and the effect of recovering adhesion with a steel cord at hygrothermal aging is small, attempts to improve these effects have been carried out by compounding resorcinol, a hybrid cross-linking agent or a great deal of cobalt (JP-A-2006-328194).

However, excellent adhesion under high temperature vulcanization condition at preparing automotive tires cannot be attained by these attempts, there is a problem that the adhesion is not sufficient compared with DCBS. If a great deal of cobalt is used, strength at break of a rubber is lowered due to thermal oxidative degradation. And if resorcinol is used, strength at break of a rubber is lowered.

SUMMARY OF THE INVENTION

The object of the present invention is to provide a rubber composition for coating a tire cord, which improves adhesion with a tire cord and has an effect of recovering adhesion with a tire cord at hygrothermal aging with maintaining the initial vulcanization rate.

The present invention relates to a rubber composition for coating a tire cord comprising 0.7 to 3 parts by weight of benzothiazolyl sulfenamide or benzothiazolyl sulfenimide represented by the chemical formula (1):

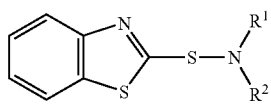

(wherein $R^1$ is a linear alkyl group having a branched structure of 3 to 16 carbon atoms, and $R^2$ is a linear alkyl group having a branched structure of 3 to 16 carbon atoms or a benzothiazolyl sulfide group) and 3 to 7 parts by weight of sulfur based on 100 parts by weight of a rubber component containing at least 60% by weight of a natural rubber and/or an isoprene rubber.

It is preferable that a resorcin resin and a cresol resin are not contained in the rubber composition.

It is preferable that the tire cord is a tire steel cord.

Further, the present invention also relates to a tire cord coated with the above rubber composition for coating a tire cord.

DETAILED DESCRIPTION OF THE INVENTION

The rubber composition for coating a tire cord of the present invention contains 0.7 to 3 parts by weight of benzothiazolyl sulfenamide or benzothiazolyl sulfenimide represented by the chemical formula (1):

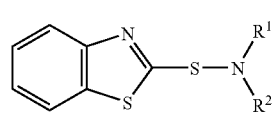

(wherein $R^1$ is a linear alkyl group having a branched structure of 3 to 16 carbon atoms, and $R^2$ is a linear alkyl group having a branched structure of 3 to 16 carbon atoms or a benzothiazolyl sulfide group) and 3 to 7 parts by weight of sulfur based on 100 parts by weight of a rubber component containing at least 60% by weight of a natural rubber and/or an isoprene rubber. Herein, examples of the tire cord are tire steel cord and tire fiber cord.

The natural rubber includes not only a natural rubber as it is, but also an epoxidized natural rubber (ENR) and a deproteinized natural rubber (DPNR). The natural rubber and/or the isoprene rubber can be used in combination with other rubber components. Examples of the other rubber components are styrene-butadiene rubber (SBR), styrene-isoprene-butadiene rubber (SIBR), butadiene rubber (BR), ethylene-propylene-diene rubber (EPDM), chloroprene rubber (CR), butyl rubber (IIR), acrylonitrile-butadiene rubber (NBR), and the like. Among these rubbers, high-cis BR, modified BR, and modified SBR are preferable. Examples of the modified BR are a polybutadiene rubber (a) (BR (a)) containing 1,2-syn-diotactic polybutadiene crystalline, a polybutadiene rubber modified with tin (b) (BR(b)), and the like.

In case of mixing with the other rubber component, the amount of NR and/or IR is preferably at least 60% by weight in the rubber component, more preferably at least 70% by weight, most preferably 100% by weight. If the amount is less than 60% by weight, strength at break tends to become lower.

In the present invention, benzothiazolyl sulfenamide or benzothiazolyl sulfenimide represented by the chemical formula (1) is used as a vulcanization accelerator. $R^1$ in the chemical formula (1) is a linear alkyl group having a branched structure of 3 to 16 carbon atoms, and $R^2$ is a linear alkyl group having a branched structure of 3 to 16 carbon atoms or a benzothiazolyl sulfide group. The linear alkyl group consists of 3 to 16 carbon atoms, preferably 4 to 16, and more preferably 6 to 12. If the number is at most 2, initial vulcanization rate is fast and adhesion becomes low. If the number is at least 17, initial vulcanization rate is too slow and rubber hardness becomes low. Examples of the preferable alkyl groups in $R^1$ and $R^2$ are t-butyl, 2-ethylhexyl, 2-methylhexyl, 3-ethylhexyl, 3-methylhexyl, 2-ethylpropyl, 2-ethylbutyl, 2-ethylpentyl, 2-ethylheptyl, 2-ethyloctyl, and the like. In the viewpoint that the number of the raw materials decreases, yield increases, purity becomes high and the cost is reduced, $R^1$ and $R^2$ are preferably the same.

An example of $R^2$ in the chemical formula (1) includes a benzothiazolyl sulfide group represented by the following chemical formula.

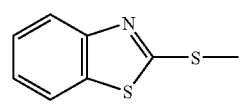

In case that $R^2$ is a benzothiazolyl sulfide group, the compound represented by the chemical formula (1) becomes benzothiazolyl sulfenimide. If $R^1$ is t-butyl group, $R^2$ is preferably a benzothiazolyl sulfide group.

As examples of benzothiazolyl sulfenamide or benzothiazolyl sulfenimide represented by the chemical formula (1), examples thereof are BEHZ (N,N-di(2-ethylhexyl)-2-benzothiazolyl sulfeneamide) available from KAWAGUCHI CHEMICAL INDUSTRY CO., LTD., BMHZ (N,N-di(2-methylhexyl)-2-benzothiazolyl sulfeneamide), SANTOCURE TBSI (N-tert-butyl-2-benzothiazolyl sulfeneimide) available from Flexsys Corporation, and the like.

The lower limit of the amount of benzothiazolyl sulfenamide or benzothiazolyl sulfenimide represented by the chemical formula (1) is at least 0.7 part by weight, preferably 0.8 part by weight, based on 100 parts by weight of the rubber component containing at least 60% by weight of NR and/or IR. If the amount is less than 0.7 part by weight, rubber hardness is low and strength at break becomes low. The upper limit thereof is at most 3 parts by weight, preferably 2.7 parts by weight. If the amount is more than 2.7 parts by weight, adhesion to the cord becomes low.

The amount of sulfur is at least 3 parts by weight, preferably 3.5 parts by weight, based on 100 parts by weight of NR and/or IR. If the amount is less than 3 parts by weight, adhesion between the obtained rubber composition and the cord becomes insufficient. And the amount of sulfur is at most 7 parts by weight, preferably 6.5 parts by weight. If the amount is more than 7 parts by weight, adhesion to the adjacent parts becomes low and concentration of sulfur becomes uneven due to blooming.

The rubber composition for coating a tire cord of the present invention preferably contains no resorcin resin and cresol resin in order to improve strength at break. Herein, since the resorcin resin includes a modified resorcin resin and the cresol resin includes a modified cresol resin, "contains no resorcin resin and cresol resin" means "do not contain all of a resorcin resin, a modified resorcin resin, a cresol resin, and a modified cresol resin".

To the runner composition of the present invention, fillers such as carbon black, silica and calcium carbonate, and additives such as a plasticizer, zinc oxide, a vulcanization assistant, a foaming agent, an antioxidant, and a wax can be compounded in addition to the above-mentioned rubber component, sulfur and a vulcanization accelerator, if necessary.

The amount of carbon black is preferably at least 40 parts by weight, more preferably 45 parts by weight, based on 100 parts by weight of the rubber components containing at least 60% by weight of NR and/or IR. If the amount is less than 40 parts by weight, rubber hardness becomes low and strength at break becomes low. And the amount of carbon black is preferably at most 70 parts by weight, more preferably 65 parts by weight. If the amount is more than 70 parts by weight, heat buildup becomes high and durability tents to become low.

The amount of silica is preferably at least 4 parts by weight, more preferably 5 parts by weight, based on 100 parts by weight of the rubber components containing at least 60% by weight of NR and/or IR. If the amount is less than 4 parts by weight, the effect for improving elongation at break tends to decrease. And the amount of silica is preferably at most 20 parts by weight, more preferably at most 15 parts by weight. If the amount is more than 20 parts by weight, vulcanization rate becomes low, adhesion for a cord decreases and rubber hardness decreases.

There is no particular limitation for the silane coupling agent, and the conventional silane coupling agent can be used. The amount of silane coupling agent is preferably at least 4 parts by weight, more preferably 6 parts by weight, based on 100 parts by weight of silica. If the amount is less than 4 parts by weight, tan δ tends to become high. And the amount of the silane coupling agent is preferably at most 10 parts by weight, more preferably at most 8 parts by weight. If the amount is more than 10 parts by weight, cost becomes high and elongation at break becomes low.

As the vulcanization assistant, an organic cobalt is exemplified to act as a role of cross-linking a cord and a rubber, adhesion between a cord and a rubber can be improved by compounding the organic cobalt. Examples of the organic cobalt are cobalt stearate, cobalt naphthenate, and cobalt neodecanate. Cobalt stearate is preferable. The amount of the organic cobalt converted to cobalt is preferably at least 0.05 part by weight, more preferably 0.1 part by weight, based on 100 parts by weight of the rubber components of NR and/or IR. If the amount is less than 0.05 part by weight, adhesion between a coating layer of the steel cord and the rubber is not sufficient. And the amount is preferably at most 0.8 part by weight, preferably at most 0.2 part by weight. If the amount is more than 0.8 part by weight, oxidative degradation of the rubber becomes remarkable and properties at break become low.

Adhesion to the tire cord is important to the new tire, and initial vulcanization rate becomes an important factor for the adhesion. In the rubber composition of the present invention, since a particular vulcanization accelerator is used, vulcanization rate becomes suitable, and during vulcanization, copper on the surface of the coating of the tire cord, sulfur and cobalt in the rubber can migrate and bind each other under the suitable fluidity. And also since reversion is not so large, formed binding of copper-sulfur-rubber is not cleaved, lowering of elongation at break can be inhibited and durability of the rubber can be improved in case of using only a natural rubber as the rubber component.

From the rubber composition of the present invention, after a tire cord is coated with the rubber composition to form the belt layer, it is laminated with other tire parts to form the un-vulcanized tire, and a pneumatic tire (a radial tire and the like) can be obtained by vulcanizing. Herein, the belt layer is used in the radial tire among breaker layers, it strongly tighten up carcass to play a role of raise the rigidity of tread. It is most preferable that the rubber composition of the present invention is used for coating steel cord in the belt layer, from the viewpoint that tension occurred by the tire pneumatic pressure is large and large strain between the other adjacent and intersectional belt occurs at rolling motion.

The rubber composition for coating a tire cord of the present invention is used for topping of a tire cord, edge strip, insulation, and the like. The edge strip and the insulation are located adjacently to a cord, and it's compound is the same as the cord topping rubber, or it shows the similar properties.

The present invention also relates to a tire cord coated with the rubber composition for coating a tire cord. Examples of the tire cord are carcass cord, fillers, bands, breaker (belt), and the like. Examples of steel cord are steel cord for a tire, 2+2/0.23 (a tire cord obtained by twisting two cords and two cords of line diameter 0.23 mm), a high tension cord coated with brass, and the like.

EXAMPLES

The present invention is concretely explained based on the following examples below, but the present invention is not limited thereto.

Examples 1 to 11 and Comparative Examples 1 to 10 (material) NR: TSR20 (made in Thailand) BR1250H: butadiene rubber available from ZEON CORPORATION (polymerized by using lithium as an polymerization initiator) carbon black N330: Carbon black N330 available from CABOT JAPAN K.K. carbon black N326: Carbon black N326 available from CABOT JAPAN K.K. silica Z115G: Z115Gr available from Rhodia Corporation silane coupling agent: Si69 available from DEGGUSA Corporation cobalt stearate: available from DAINIPPON INK AND CHEMICALS,INCORPORATED insoluble sulfur treated with oil: CRYSTEX available from Flexsys Corporation (insoluble sulfur 80%, containing 20% of oil, the amounts of the total insoluble sulfur treated with oil including the amounts of oil are described oil in the tables)

Vulcanization accelerator DCBS: ACCEL DZ-G available from KAWAGUCHI CHEMICAL INDUSTRY CO., LTD. (N,N-dicyclohexyl benzothiazolyl sulfenamide) Vulcanization accelerator BEHZ: ACCEL BEHZ available from KAWAGUCHI CHEMICAL INDUSTRY CO., LTD. (N,N-di(2-ethylhexyl)-2- benzothiazolyl sulfenamide) Vulcanization accelerator TBBS: NOCCELER NS (N-tert-butyl-2-benzothiazolyl-sulfenamide) available from OUCHI SHINKO CHEMICAL INDUSTRIAL COMPANY, LIMITED Vulcanization accelerator DM: NOCCELER DM (Dibenzothiazyldisulfide) available from OUCHI SHINKO CHEMICAL INDUSTRIAL COMPANY, LIMITED Vulcanization accelerator TBSI: SANTOCURE TBSI (N-tert-butyl-2-benzothiazolyl sulfenimide) available from Flexsys Corporation SUMIKANOL 620: resorcin resin (resorcin-alkylphenol-formaldehyde copolymer) available from SUMITOMO CHEMICAL COMPANY, LIMITED SUMIKANOL 507A: HMMPME ((hexamethylol melamine) pentamethyl ether available from SUMITOMO CHEMICAL COMPANY, LIMITED HTS: DURALINK HTS available from Flexsys Corporation (hexamethylene bisthiosulfate disodium dihydrate) aroma oil: PROCESS X-140 110 available from JAPAN ENERGY CORPORATION) antioxidant: NOCLAC 6C (N-1,3-dimethylbutyl-N'-phenyl-p-phenylenediamine) available from OUCHI SHINKO CHEMICAL INDUSTRIAL COMPANY, LIMITED zin oxide: GINREI R available from TOHO ZINC CO.,LTD.

(Preparation Process)

Various agents other than sulfur and a vulcanization accelerator among the compounding components shown in Tables 1 and 2 were kneaded by a Bunbury mixer, to the obtained kneaded product were added insoluble sulfur treated with oil and various vulcanization accelerators, and were kneaded by an open roll to obtain an unvulcanized rubber composition. The unvulcanized rubber composition was press vulcanized for 30 minutes at 150° C. to obtain a vulcanized rubber sample. Aroma oil, an antioxidant and zinc oxide are not described in Tables 1 and 2, but they were added in all Examples and Comparative Examples in an amount of 2 parts by weight, 1 part by weight, and 10 parts by weight, respectively, and the vulcanization accelerator was compounded in such a way that the molar ratio became the same as 1 part by weight of DCBS.

(Measuring Method)

<Vulcanization Test>

By using the vibration vulcanization test machine (curelastometer) described in JIS K6300, a vulcanization rate curve plotted with time and torque was obtained after vulcanization test at the measuring temperature of 160° C. If the minimum torque in the vulcanization rate curve is regarded as ML, the maximum thereof as MH, the difference (MH−ML) as ME, time T10 (minute) which is the time to reaching to ML+0.1ME was read off.

<Tensile Test (Tensile Strength and Elongation at Break)>

Tensile test was carried out by using a dumbbell specimen of 3 type according to JIS K6251 to measure elongation at break (%) at room temperature.

<Adhesion Test>

Adhesion test was carried out to measure a rubber coating ratio (%) of the rubber composition. The rubber coating ratio was expressed by an index of the ratio of the part coated with a rubber at the stripped plane when a steel cord and a rubber were stripped away. 5 shows coated 100% all surface and 0 shows not completely coated. The rubber coating ratio of the rubber composition after hygrothermal aging at BOC, humidity 95% for 150 hours was also measured.

<Viscoelasticity Test>

Specimens having predetermined size were prepared from the vulcanized rubber composition. And complex elastic modulus (E*) and loss tangent (tan δ) of the rubber specimen at 70° C. were measured under the condition of initial strain 10%, dynamic strain 2%, and frequency 10 Hz by using Viscoelastometer VES made by Iwamoto Seisakusyo. The bigger E* is, the more excellent the rigidity is.

Respective test results are shown in Tables 1 and 2.

TABLE 1

| | Example | | | | Comparative Example | | | | | | |
|---|---|---|---|---|---|---|---|---|---|---|---|
| | 1 | 2 | 3 | 4 | 1 | 2 | 3 | 4 | 5 | 6 | 7 |
| NR | 100 | 100 | 100 | 100 | 100 | 100 | 100 | 100 | 100 | 100 | 100 |
| Carbon black | 60 | 60 | 60 | 60 | 60 | 60 | 60 | 60 | 60 | 60 | 54 |
| Cobalt stearate | 1.0 | 1.0 | 1.0 | 1.0 | 1.0 | 1.0 | 1.0 | 1.0 | 1.0 | 1.0 | 2.0 |
| Insoluble sulfur | 7.0 | 7.0 | 7.0 | 7.0 | 7.0 | 7.0 | 7.0 | 7.0 | 7.0 | 7.0 | 7.0 |
| DCBS | — | — | — | — | 1.00 | 1.00 | 1.00 | — | — | — | — |
| BEHZ | 1.17 | 2.0 | 1.17 | 1.17 | — | — | — | — | — | — | — |
| TBBS | — | — | — | — | — | — | — | 0.73 | — | 0.73 | 0.73 |
| DM | — | — | — | — | — | — | — | — | 0.48 | — | — |
| SUMIKANOL 620 | — | — | — | 1.0 | — | 1.0 | — | — | — | 1.0 | 2.0 |
| SUMIKANOL 507A | — | — | — | 1.5 | — | 1.5 | — | — | — | 1.5 | 3.0 |
| HTS | — | — | 0.5 | — | — | — | 0.5 | — | — | 0.5 | 0.5 |
| T10 | 2.2 | 1.5 | 2.2 | 2.5 | 2.0 | 2.3 | 2.0 | 1.8 | 1.4 | 2.1 | 2.4 |
| E* (Pa) | 6.0 | 7.8 | 6.3 | 7.2 | 6.0 | 7.1 | 6.4 | 6.1 | 5.4 | 7.8 | 8.8 |
| EB (%) | 420 | 320 | 430 | 350 | 320 | 260 | 300 | 330 | 370 | 240 | 210 |
| Cord adhesion | | | | | | | | | | | |
| New | 5.0 | 4.0 | 5.0 | 5.0 | 5.0 | 5.0 | 5.0 | 3.0 | 3.0 | 4.5 | 4.5 |
| After hygothermal aging | 3.5 | 3.0 | 4.5 | 4.0 | 2.0 | 3.0 | 3.5 | 1.0 | 1.5 | 2.5 | 3.0 |

TABLE 2

|  | Example | | | | | | | Comparative Example | | |
|---|---|---|---|---|---|---|---|---|---|---|
|  | 5 | 6 | 7 | 8 | 9 | 10 | 11 | 8 | 9 | 10 |
| NR | 100 | 100 | 100 | 100 | 90 | 80 | 60 | 100 | 100 | 100 |
| BR1250H | — | — | — | — | 10 | 20 | 40 | — | — | — |
| Carbon black | 60 | 60 | 63 | 60 | 60 | 60 | 60 | 60 | 60 | 60 |
| Cobalt stearate | 1.0 | 1.0 | 1.5 | 1.0 | 1.0 | 1.0 | 1.0 | 1.0 | 1.0 | 1.0 |
| Insoluble sulfur (sulfur) | 7.0 (5.6) | 6.25 (5.0) | 5.63 (4.5) | 7.0 | 7.0 | 7.0 | 7.0 | 7.0 | 7.0 | 7.0 |
| DCBS | 0.5 | — | — | — | — | — | — | — | — | — |
| BEHZ | 1.17 | 1.17 | 1.17 | 1.17 | 1.17 | 1.17 | 1.17 | 0.6 | 3.5 | 0.6 |
| TBBS | — | — | — | — | — | — | — | — | — | — |
| DM | — | — | — | — | — | — | — | — | — | — |
| SUMIKANOL 620 | — | — | — | 1.0 | 1.0 | 1.0 | 1.0 | — | — | 1.0 |
| SUMIKANOL 507A | — | — | — | 1.5 | 1.5 | 1.5 | 1.5 | — | — | 1.5 |
| HTS | — | — | — | — | — | — | — | — | — | — |
| T10 | 1.6 | 2.2 | 2.1 | 2.4 | 2.4 | 2.7 | 3.5 | 2.2 | 1.4 | 2.3 |
| E* (Pa) | 7.7 | 5.6 | 5.7 | 7.2 | 6.1 | 6.2 | 6.3 | 4.8 | 8.3 | 5.1 |
| EB (%) | 310 | 460 | 400 | 340 | 380 | 330 | 230 | 470 | 250 | 440 |
| Cord adhesion |  |  |  |  |  |  |  |  |  |  |
| New | 4.0 | 4.5 | 4.5 | 5.0 | 4.5 | 4.5 | 4 | 5.0 | 2.5 | 5.0 |
| After hygothermal aging | 3.0 | 3.0 | 3.0 | 4.5 | 3.5 | 3.0 | 2.5 | 4.5 | 2.0 | 5.0 |

From the evaluation results of Tables 1 and 2, it is understood that elongation at break and cord adhesion property are excellent compared with DCBS in Comparative Example 1 in case of using the vulcanization accelerator BEHZ.

Examples 12 to 21 and Comparative Examples 11 to 19

Preparation Process

Various agents other than sulfur and a vulcanization accelerator among the compounding components shown in Tables 3 and 4 were kneaded by a Bunbury mixer, to the obtained kneaded product were added insoluble sulfur treated with oil and various vulcanization accelerators, and were kneaded by an open roll to obtain an unvulcanized rubber composition. The unvulcanized rubber composition was press vulcanized for 30 minutes at 150° C. to obtain a vulcanized rubber sample. Aroma oil, an antioxidant and zinc oxide are not described in Tables 3 and 4, but they were added in all Examples and Comparative Examples in an amount of 2 parts by weight, 1 part by weight, and 10 parts by weight, respectively, and the vulcanization accelerator was compounded in such a way that the molar ratio became the same as 1 part by weight of DCBS.

The compositions obtained in Examples 12 to 21 and Comparative Examples 11 to 19 were evaluated in the same measuring methods as described above. Respective test results are shown in Tables 3 and 4.

TABLE 3

|  | Example | | | | | Comparative Example | | | | |
|---|---|---|---|---|---|---|---|---|---|---|
|  | 12 | 13 | 14 | 15 | 16 | 11 | 12 | 13 | 14 | 15 |
| NR | 100 | 100 | 60 | 60 | 60 | 100 | 100 | 100 | 100 | 100 |
| BR1250H | — | — | 40 | 40 | 40 | — | — | 60 | 60 | 60 |
| Carbon blackN326 | 60 | 60 | 60 | 50 | 50 | 60 | 60 | 60 | 50 | 50 |
| Cobalt stearate | 1.0 | 1.0 | 1.0 | 1.0 | 1.0 | 1.0 | 1.0 | 1.0 | 1.0 | 1.0 |
| Insoluble sulfur | 7.0 | 7.0 | 7.0 | 7.0 | 5.63 | 7.0 | 7.0 | 7.0 | 7.0 | 5.63 |
| DCBS | — | — | — | — | — | 1.00 | 1.00 | 1.00 | 1.00 | 1.2 |
| TBSI | 0.8 | 0.8 | 0.8 | 0.8 | 1.4 | — | — | — | — | — |
| SUMIKANOL 620 | — | 1.0 | 1.0 | 2.0 | 2.0 | — | 1.0 | 1.0 | 2.0 | 2.0 |
| SUMIKANOL 507A | — | 1.5 | 1.5 | 3.0 | 3.0 | — | 1.5 | 1.5 | 3.0 | 3.0 |
| T10 | 1.8 | 2.1 | 3.3 | 3.6 | 3.2 | 2.0 | 2.3 | 3.5 | 4.0 | 3.6 |
| E* (Pa) | 6.1 | 7.2 | 6.5 | 6.4 | 6.3 | 6.0 | 7.1 | 6.3 | 6.3 | 6.2 |
| EB (%) | 315 | 255 | 250 | 245 | 255 | 320 | 260 | 230 | 240 | 235 |
| Tan δ (×10$^3$) | 155 | 140 | 105 | 92 | 86 | 170 | 160 | 109 | 95 | 90 |
| Cord adhesion |  |  |  |  |  |  |  |  |  |  |
| New | 5.0 | 5.0 | 4.5 | 5.0 | 4.5 | 5.0 | 5.0 | 4.0 | 4.5 | 4.0 |
| After hygothermal aging | 2.0 | 3.0 | 3.0 | 4.5 | 3.0 | 2.0 | 3.0 | 2.5 | 4.0 | 2.5 |

TABLE 4

|  | Example | | | | | Comparative Example | | | |
|---|---|---|---|---|---|---|---|---|---|
|  | 17 | 18 | 19 | 20 | 21 | 16 | 17 | 18 | 19 |
| NR | 75 | 75 | 75 | 100 | 100 | 75 | 75 | 75 | 100 |
| BR1250H | 25 | 25 | 25 | — | — | 25 | 25 | 25 | — |
| Carbon black N326 | 45 | 45 | 45 | 60 | 60 | 45 | 45 | 45 | 60 |
| Silica Z115G | 10 | 10 | 10 | — | — | 10 | 10 | 10 | — |
| Silane coupling agent | 0.8 | 0.8 | 0.8 | — | — | 0.8 | 0.8 | 0.8 | — |
| Cobalt stearate | 1.0 | 1.0 | 1.0 | 1.0 | 1.0 | 1.0 | 1.0 | 1.0 | 1.0 |
| Insoluble sulfur | 7.0 | 7.0 | 7.0 | 7.0 | 7.0 | 7.0 | 7.0 | 7.0 | 7.0 |
| HTS | — | 0.5 | — | 0.5 | — | — | 0.5 | — | 0.5 |
| DCBS | — | — | — | — | — | 1.0 | 1.0 | 1.0 | 0.8 |
| TBSI | 0.8 | 0.8 | 0.8 | 0.6 | 0.8 | — | — | — | — |
| SUMIKANOL 620 | — | — | 1.0 | — | — | — | — | 1.0 | — |
| SUMIKANOL 507A | — | — | 1.5 | — | — | — | — | 1.5 | — |
| T10 | 2.4 | 2.2 | 2.7 | 1.8 | 1.8 | 2.7 | 2.5 | 3.1 | 2.1 |
| E* (Pa) | 5.5 | 6.0 | 6.5 | 6.2 | 6.0 | 5.6 | 6.2 | 6.6 | 6.2 |
| EB (%) | 270 | 265 | 240 | 340 | 320 | 270 | 270 | 235 | 335 |
| Tanδ | 0.092 | 0.092 | 0.09 | 0.15 | 0.16 | 0.096 | 0.098 | 0.096 | 0.16 |
| Cord adhesion | | | | | | | | | |
| New | 5.0 | 5.0 | 5.0 | 5.0 | 5.0 | 5.0 | 5.0 | 5.0 | 5.0 |
| After hygothermal Aging | 3.5 | 4.5 | 4.5 | 4.0 | 2.0 | 3.5 | 4.0 | 4.5 | 4.0 |

From the evaluation results of Tables 3 and 4, it is understood that elongation at break and cord adhesion property are excellent compared with DCBS in Comparative Example 11 in case of using the vulcanization accelerator TBSI.

According to the present invention, adhesion to a tire cord at hygrothermal aging can be improved and strength at break can be increased with considering the environment problems by using the particular vulcanization accelerator.

The invention claimed is:

1. A rubber composition for coating a tire cord comprising 0.7 to 3 parts by weight of benzothiazolyl sulfenamide or benzothiazolyl sulfenimide represented by the chemical formula (1):

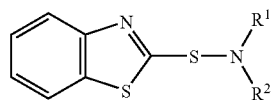
(1)

wherein $R^1$ is a linear alkyl group having a branched structure of 4 to 16 carbon atoms, and $R^2$ is a linear alkyl group having a branched structure of 4 to 16 carbon atoms or a benzothiazolyl sulfide group based on 100 parts by weight of a rubber component containing at least 60% by weight of a natural rubber and/or an isoprene rubber, 45 to 70 parts by weight of carbon black based on 100 parts by weight of said rubber component or 4 to 20 parts by weight of silica based on 100 parts by weight of said rubber component and 3 to 7 parts by weight of sulfur based on 100 parts by weight of said rubber component, and 0.05 to 0.2 parts by weight of an organic cobalt converted to cobalt based on 100 parts by weight of said rubber component and wherein said rubber composition does not contain either resorcin resin or cresol resin.

2. The rubber composition for coating a tire cord of claim 1, wherein the tire cord is a tire steel cord.

3. The rubber composition for coating tire cord of claim 1, wherein the organic cobalt is cobalt stearate.

4. A tire having a tire cord which is coated with the rubber composition for coating a tire cord of claim 1.

5. A tire cord, which is coated with the rubber composition for coating a tire cord of claim 1.

6. A tire having a belt layer which comprises the tire cord according to claim 5.

* * * * *